United States Patent
Wu et al.

(10) Patent No.: US 11,362,599 B2
(45) Date of Patent: Jun. 14, 2022

(54) CONTROLLING METHOD FOR SINGLE-PHASE BIDIRECTIONAL INVERTER AND DEVICE THEREOF

(71) Applicant: NATIONAL TSING HUA UNIVERSITY, Hsinchu (TW)

(72) Inventors: Tsai-Fu Wu, Hsinchu (TW); Temir Sakavov, Hsinchu (TW); Yen-Hsiang Huang, Hsinchu (TW); Yun-Tsung Liu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 150 days.

(21) Appl. No.: 16/907,300

(22) Filed: Jun. 21, 2020

(65) Prior Publication Data
US 2021/0257928 A1    Aug. 19, 2021

(30) Foreign Application Priority Data
Feb. 15, 2020   (TW) ................... 109104897

(51) Int. Cl.
*H02M 7/797* (2006.01)
*H02M 1/12* (2006.01)
*H02M 1/00* (2006.01)

(52) U.S. Cl.
CPC ........... *H02M 7/797* (2013.01); *H02M 1/126* (2013.01); *H02M 1/0009* (2021.05)

(58) Field of Classification Search
CPC ..... H02M 7/797; H02M 1/126; H02M 1/0009
USPC ........................................................ 363/132
See application file for complete search history.

(56) References Cited

U.S. PATENT DOCUMENTS

| 6,282,111 B1* | 8/2001 | Illingworth | ....... H02M 7/53871 363/132 |
| 2013/0264984 A1* | 10/2013 | Tamura | .................... H02M 7/48 318/400.27 |
| 2015/0207433 A1* | 7/2015 | Liu | .......................... H02M 1/40 363/132 |

(Continued)

OTHER PUBLICATIONS

Received STIC search report from EIC 2800 searcher Angela Brooks for claim 1 on Jun. 29, 2021. (Year: 2021).*

(Continued)

*Primary Examiner* — Shawki S Ismail
*Assistant Examiner* — Htet Z Kyaw
(74) *Attorney, Agent, or Firm* — CKC & Partners Co., LLC

(57) ABSTRACT

A controlling method is for a single-phase bidirectional inverter. The single-phase bidirectional inverter includes a switch and an inductor. The controlling method for the single-phase bidirectional inverter includes an extracting step, a calculating step, and an integrating step. In the extracting step, a current command is inputted to the switch and obtaining a current through the inductor. The current is piecewisely linearized to extract a magnetizing inductance and a demagnetizing inductance of the inductor. In the calculating step, a duty ratio of the switch is used to calculate a variation of the current of the magnetizing inductance and a variation of the current of the demagnetizing inductance. In the integrating step, the variation of the current of the magnetizing inductance and the variation of the current of the demagnetizing inductance are integrated to obtain another duty ratio of the switch in the next cycle.

7 Claims, 7 Drawing Sheets

(56) References Cited

U.S. PATENT DOCUMENTS

2020/0106370 A1* 4/2020 Chen ................ H02M 7/53871
2021/0126553 A1* 4/2021 Chen ................ H02M 7/5387

OTHER PUBLICATIONS

Received STIC search report from EIC 2800 searcher Heidi Myers for claim 4 on Jun. 30, 2021. (Year: 2021).*
Received STIC search report from EIC 2800 searcher Steve Chung, Chikasaw for claim 5 on Jun. 28, 2021. (Year: 2021).*
Received STIC search report from EIC 2800 searcher Steve Chung, Chikasaw for claim 6 on Jun. 29, 2021. (Year: 2021).*
Received STIC search report from EIC 2800 searcher Benyam Solomon for claim 7 on Jun. 29, 2021. (Year: 2021).*

* cited by examiner

CONTROLLING METHOD FOR SINGLE-PHASE BIDIRECTIONAL INVERTER AND DEVICE THEREOF

RELATED APPLICATIONS

This application claims priority to Taiwan Application Serial Number 109104897, filed Feb. 15, 2020, which is herein incorporated by reference.

BACKGROUND

Technical Field

The present disclosure relates to a controlling method for a single-phase bidirectional inverter and a device thereof. More particularly, the present disclosure relates to a controlling method and a device for a single-phase bidirectional inverter with different variations of output filter magnetizing and demagnetizing inductances.

DESCRIPTION OF RELATED ART

In recent years, a current tracking has been widely applied to grid-connected inverters, active power filters, and active rectifiers. In particular, when an inverter adopts a digital control directly which has a variable proportional gain, the parameter accuracy is very important for the control law. Traditionally, a magnetizing inductance and a demagnetizing inductance are considered to be the same during one switching cycle. Therefore, when the control law of the current tracking of the inverter is derived, only the nominal inductance in the manufacturer's data is considered.

Although the conventional digital control can take into account the inductance variation caused by the bias current, only the magnetizing inductance is used in the expression of the existing control law. However, under the controller's high switching frequency and different magnetic offsets, when the core inductor is used, the magnetizing inductance and the demagnetizing inductance will change significantly during the entire switching cycle, so as to affect performance of the current tracking. In view of this, the present disclosure provides an inductance estimation model and a new control law to solve the above problems.

SUMMARY

According to an embodiment of the present disclosure, a controlling method for a single-phase bidirectional inverter is provided. The single-phase bidirectional inverter includes a switch and an inductor. The controlling method for the single-phase bidirectional inverter includes an extracting step, a calculating step and an integrating step. In the extracting step, a current command is inputted to the switch and obtaining a current through the inductor. The current is piecewisely linearized to extract a magnetizing inductance and a demagnetizing inductance of the inductor. In the calculating step, a duty ratio of the switch is used to calculate a variation of the current of the magnetizing inductance and a variation of the current of the demagnetizing inductance. In the integrating step, the variation of the current of the magnetizing inductance and the variation of the current of the demagnetizing inductance are integrated to obtain another duty ratio of the switch in the next cycle.

According to another embodiment of the present disclosure, a single-phase bidirectional inverter is applied in the aforementioned controlling method. The single-phase bidirectional inverter includes an inverter module and a filter module. The inverter module includes two first switches and two second switches. The first switches are connected in series to form a bridge arm. The second switches are connected in series to form another bridge arm. An input ends of the bridge arms are coupled for forming a DC end. The DC end is connected to a DC load. The filter module is coupled with the inverter module. The filter module includes the inductor and a capacitor. The inductor is connected to the capacitor in series. The inductor and the capacitor are connected to an AC end. An end of the inductor is coupled with an output end of the bridge arm of the inverter module. An end of the capacitor is coupled with an output end of the other one of bridge arm of the inverter module.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
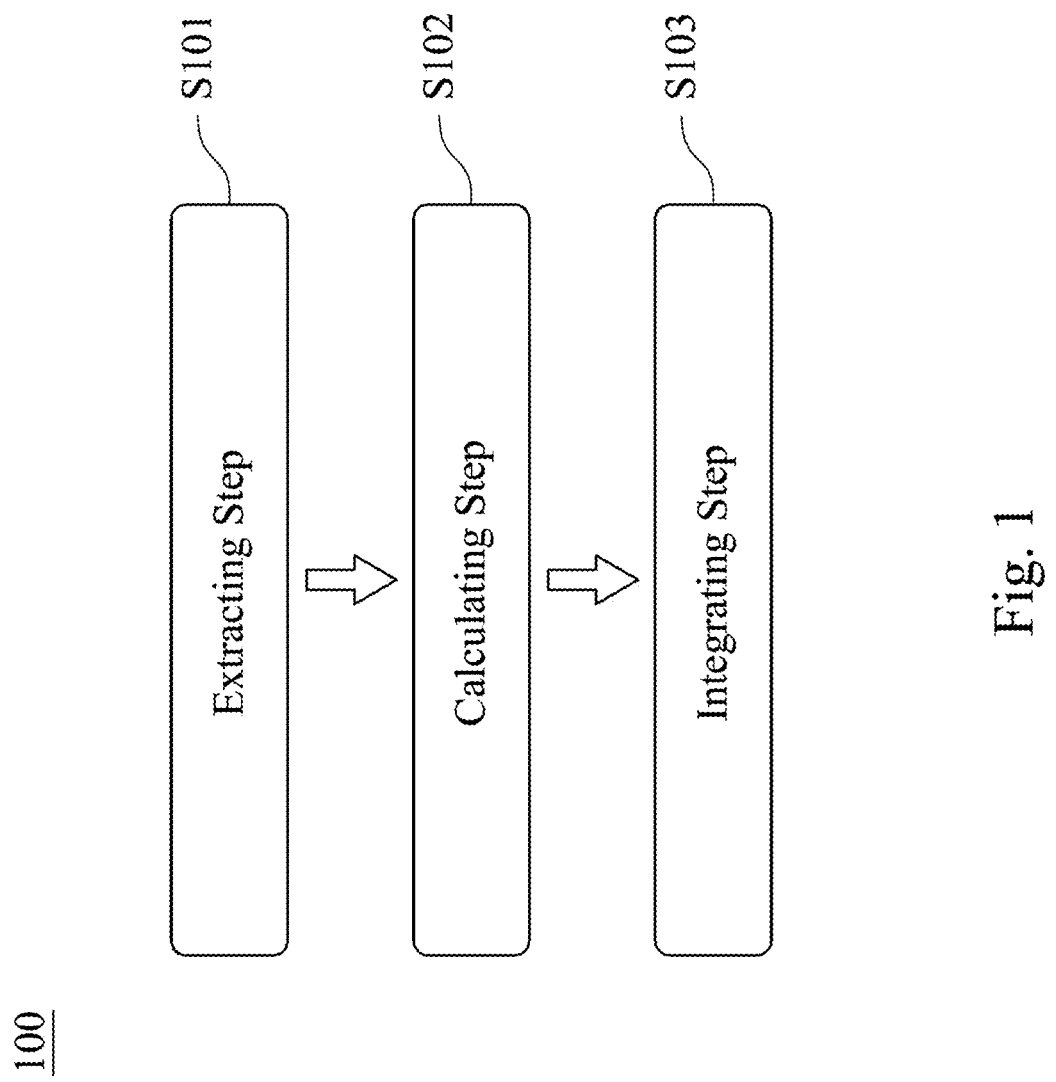
FIG. 1 is a processing block diagram of a controlling method for a single-phase bidirectional inverter according to an embodiment of the present disclosure.
Figure 2:
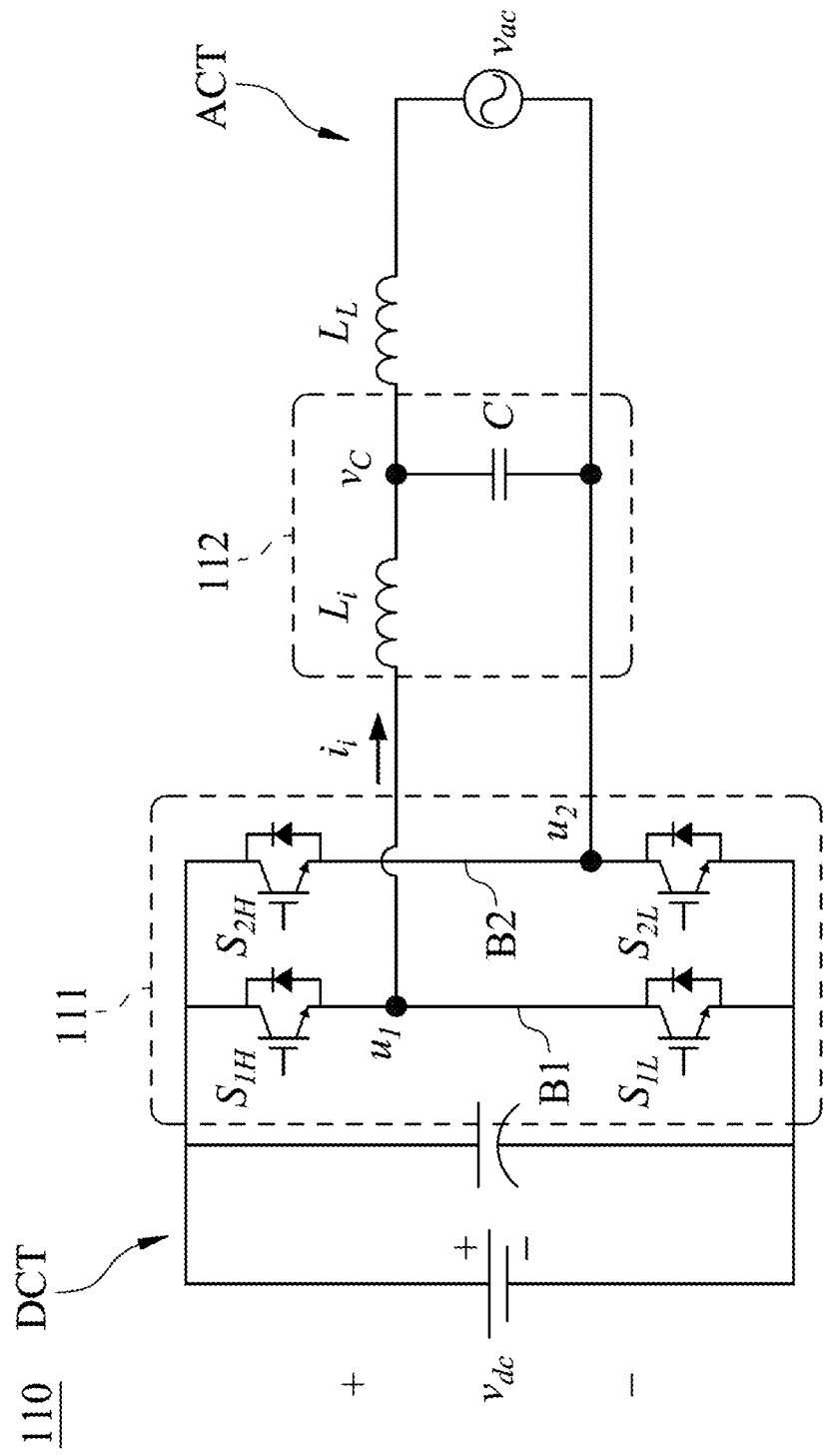
FIG. 2 is a schematic circuit diagram of the single-phase bidirectional inverter according to the controlling method of FIG. 1.

FIG. 1 is a processing block diagram of a controlling method 100 for a single-phase bidirectional inverter 110 according to an embodiment of the present disclosure. FIG. 2 is a schematic circuit diagram of the single-phase bidirectional inverter 110 according to the controlling method 100 of FIG. 1. In FIGS. 1 and 2, the controlling method 100 is for the single-phase bidirectional inverter 110. The single-phase bidirectional inverter 110 includes a switch and an inductor $L_i$. The controlling method 100 for the single-phase bidirectional inverter 110 includes an extracting step S101, a calculating step S102 and an integrating step S103. In the extracting step S101, a current command is inputted to the switch and for obtaining a current $i_i$ through the inductor $L_i$. The current $i_i$ is piecewisely linearized to extract a magnetizing inductance and a demagnetizing inductance of the inductor $L_i$. In the calculating step S102, a duty ratio of the switch is used to calculate a variation of the current $i_i$ of the magnetizing inductance and a variation of the current $i_i$ of the demagnetizing inductance. In the integrating step S103, the variation of the current $i_i$ of the magnetizing inductance and the variation of the current $i_i$ of the demagnetizing inductance are integrated to obtain another duty ratio of the switch in the next cycle. Furthermore, the controlling method 100 for the single-phase bidirectional inverter 110 can execute the extracting step S101, the calculating step S102, and the integrating step S103 through a controller (not shown).

Therefore, the controlling method 100 for the single-phase bidirectional inverter 110 can obtain a control law (herein after referred to as "new control law") by the extracting step S101, the calculating step S102, and the integrating step S103. The controlling method 100 can estimate the difference between the magnetizing inductance and the demagnetizing inductance of the inductor $L_i$ by the new control law, so as to improve a current tracking capability of the single-phase bidirectional inverter 110, so that the accuracy of the duty ratio of the switch obtained in the next cycle is improved.

The following Table 1 is device specifications of the single-phase bidirectional inverter 110 according to the embodiment of the present disclosure, but the present disclosure is not limited thereto.

TABLE 1

| Device specifications | | Filter parameters | |
|---|---|---|---|
| vdc | 380 V | $L_i$ | 220 uH~280 uH |
| $v_{ac}$ | 220 Vrms | $L_L$ | 100 uF |
| $f_s$ | 100 kHz | C | 2 uF |

In detail, according to FIG. 2, the switch of the single-phase bidirectional inverter 110 is described by using a full-bridge inverter architecture including two first switches $S_{1H}$, $S_{1L}$ and two second switches $S_{2H}$, $S_{2L}$ as examples, but the present disclosure is not limited thereto. The present disclosure can also be a half-bridge inverter architecture or other types of inverter architecture. The single-phase bidirectional inverter 110 includes an inverter module 111 and a filter module 112. The inverter module 111 includes the first switches $S_{1H}$, $S_{1L}$ and the second switches $S_{2H}$, $S_{2L}$. The first switches $S_{1H}$, $S_{1L}$ are connected in series to form a bridge arm B1, and the second switches $S_{2H}$, $S_{2L}$ are connected in series to form another bridge arm B2. Input ends of the bridge arms are coupled for forming a DC end DCT. The DC end DCT is connected to a DC load. The filter module 112 is connected to the inverter module 111. The filter module 112 includes the inductor $L_i$ and a capacitor C. The inductor $L_i$ is connected to the capacitor C in series. The inductor $L_i$ and the capacitor C are connected to an AC end ACT. An end of the inductor $L_i$ is coupled with an output end of the bridge arm B1 of the inverter module 111. An end of the capacitor C is coupled with an output end of the bridge arm B2. In detail, the input ends of the bridge arms B1 and B2 are coupled to each other as the DC end DCT. The DC end DCT is coupled to a front-end DC load (such as a solar cell) to receive/output a DC voltage $v_{dc}$. The output end of the bridge arm B1 is coupled to one end of the inductor $L_i$, the output end of the bridge arm B2 is coupled to one end of the capacitor C, and the other end of the inductor $L_i$ and the other end of the capacitor C are coupled to the AC end ACT. The AC end ACT can be an AC power source $v_{ac}$ or a mains power. An inductance $L_L$ is one of the equivalent line impedances of the AC end ACT.

Furthermore, the first switches $S_{1H}$, $S_{1L}$ and the second switches $S_{2H}$, $S_{2L}$ are controlled by corresponding control signals to switch the conducting state, respectively. The first switch $S_{1H}$ and the second switch $S_{2H}$ are an upper arm of the bridge arm B1 and an upper arm of the bridge arm B2, respectively. The first switch $S_{1L}$ and the second switch $S_{2L}$ are a lower arm of the bridge arm B1 and a lower arm of the bridge arm B2, respectively. The switches in the each of the bridge arms B1 and B2 are turned on alternately according to the received signals (for example: the switches $S_{1H}$ and $S_{1L}$ are turned on alternately, and the switches $S_{2H}$ and $S_{2L}$ are turned on alternately), so that voltages $u_1$, $u_2$ are generated at the output end of each of the bridge arms B1, B2 according to the DC voltage $v_{dc}$. The inductor $L_i$ responds to the variations in voltages $u_1$, $u_2$ to store or release energy, and then cooperates with the capacitor C to achieve the filtering effect. Therefore, the single-phase bidirectional inverter 110 can convert power between the DC end DCT and the AC end ACT.

Figure 3:
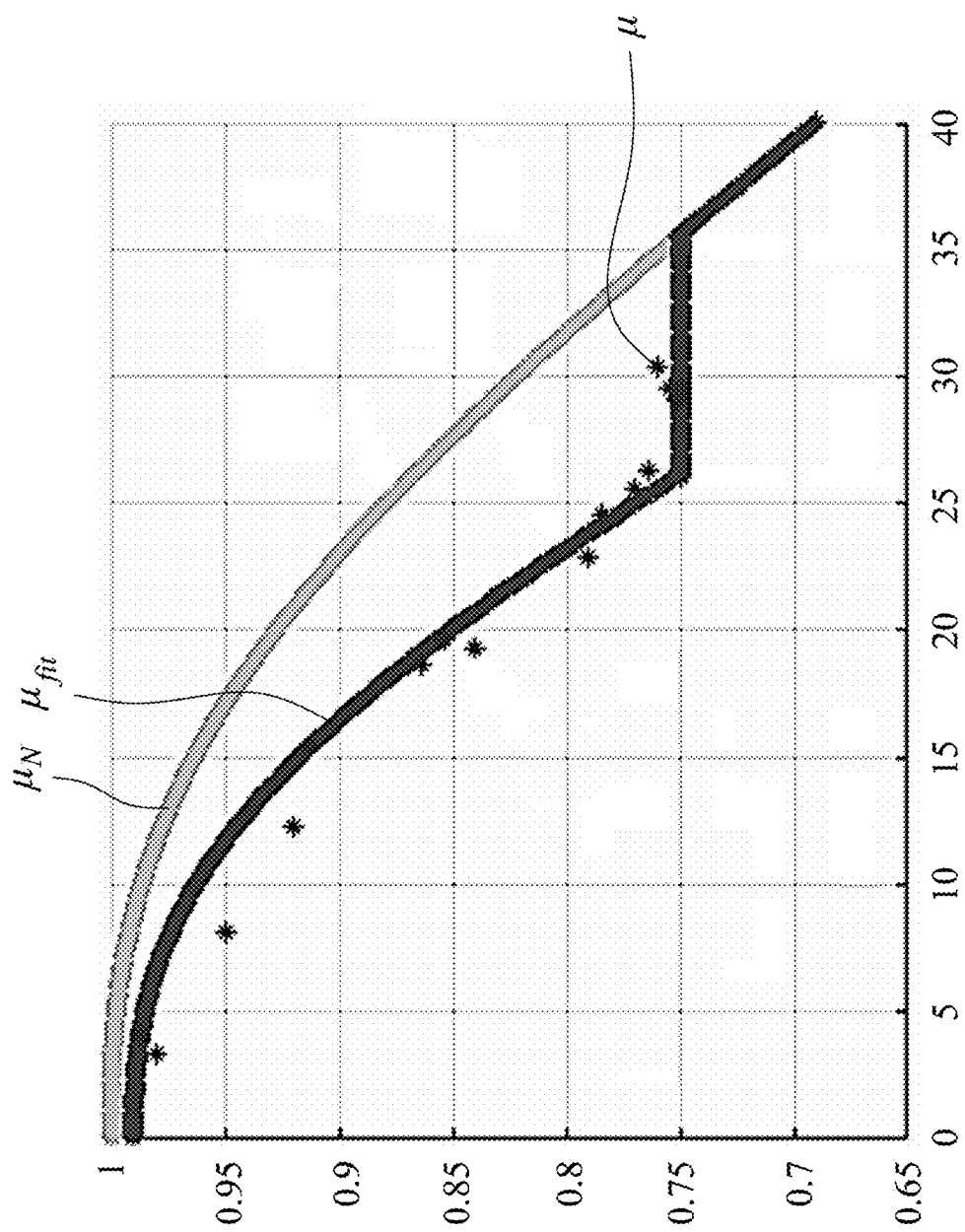
FIG. 3 is a schematic view of a nominal permeability and a fitting permeability according to the controlling method for the single-phase bidirectional inverter of FIG. 1.

The following continues to describe the calculation of the controlling method 100 for the single-phase bidirectional inverter 110 of the present disclosure. FIG. 3 is a schematic view of a nominal permeability $\mu_N$ and a fitting permeability $\mu_{fit}$ according to the controlling method 100 for the single-phase bidirectional inverter 110 of FIG. 1. In FIG. 3, according to the extracting step S101, the present disclosure proposes an inductance approximation method, which includes a magnetic permeability equation and can be expressed as equation (1):

$$\mu_{mag} = \frac{0.01}{a + bH^c}. \tag{1}$$

$\mu_{mag}$ is a magnetic permeability of the inductor $L_i$ after magnetization, H is a magnetic intensity of the inductor $L_i$, and each of a, b, and c is a constant value. The inductance approximation method is fitting mismatching parts of per unit inductance between the magnetic permeability and the magnetic force, so that per unit inductance is equal to the permeability. The inductor $L_i$ used during the experiment can be a molypermalloy powder magnetic core (CM740125), but the present disclosure is not limited thereto. From the specification database of CM740125, we can get parameters of the nominal permeability $\mu_N$ (which are, the values of a, b and c). Furthermore, the inductor $L_i$ can be measured in the experiment to obtain a permeability $\mu$ of the magnetizing inductance and the demagnetizing inductance, and the permeability $\mu$ can be integrated into parameters of the fitting permeability $\mu_{fit}$ that fits the permeability (which are, another set of values of a, b, and c), so as to derive the permeability equation. The deriving method is not the technical focus of the present disclosure, and is not described again herein.

More particularly, the current $i_i$ is positive ($i_i>0$). When the voltage of the inductor $L_i$ is positive, the equation (1) is substituted into the parameter of the fitting permeability $\mu_{fit}$ to calculate the permeability $\mu_{mag}$ after the magnetization of the inductor $L_i$, and the magnetizing inductance $L_{im}$ is extracted according to equation (2). When the voltage of the inductor $L_i$ is negative, the equation (1) is substituted into the parameter of the nominal permeability $\mu_N$ to calculate the permeability $\mu_{mag}$ after the magnetization of the inductor $L_i$, the demagnetizing inductance $L_{id}$ is extracted according to the equation (3), and the equation (2) and the equation (3) can be represented as:

$$L_{im} = L_i \mu_{mag} \quad (2);$$

$$L_{id} = L_i \mu_{mag} \quad (3).$$

Furthermore, the current $i_i$ is negative ($i_i<0$). When the voltage of the inductor $L_i$ is positive, the equation (1) is substituted into the parameter of the nominal permeability $\mu_N$ to calculate the permeability $\mu_{mag}$ after the magnetization of the inductor $L_i$, and the magnetizing inductance $L_{im}$ is extracted according to equation (2). When the voltage of the inductor $L_i$ is negative, the equation (1) is substituted into the parameter of the fitting permeability $\mu_{fit}$ to calculate the permeability $\mu_{mag}$ after the magnetization of the inductor $L_i$, and the demagnetizing inductance Lia is extracted according to the equation (3).

Figure 4:
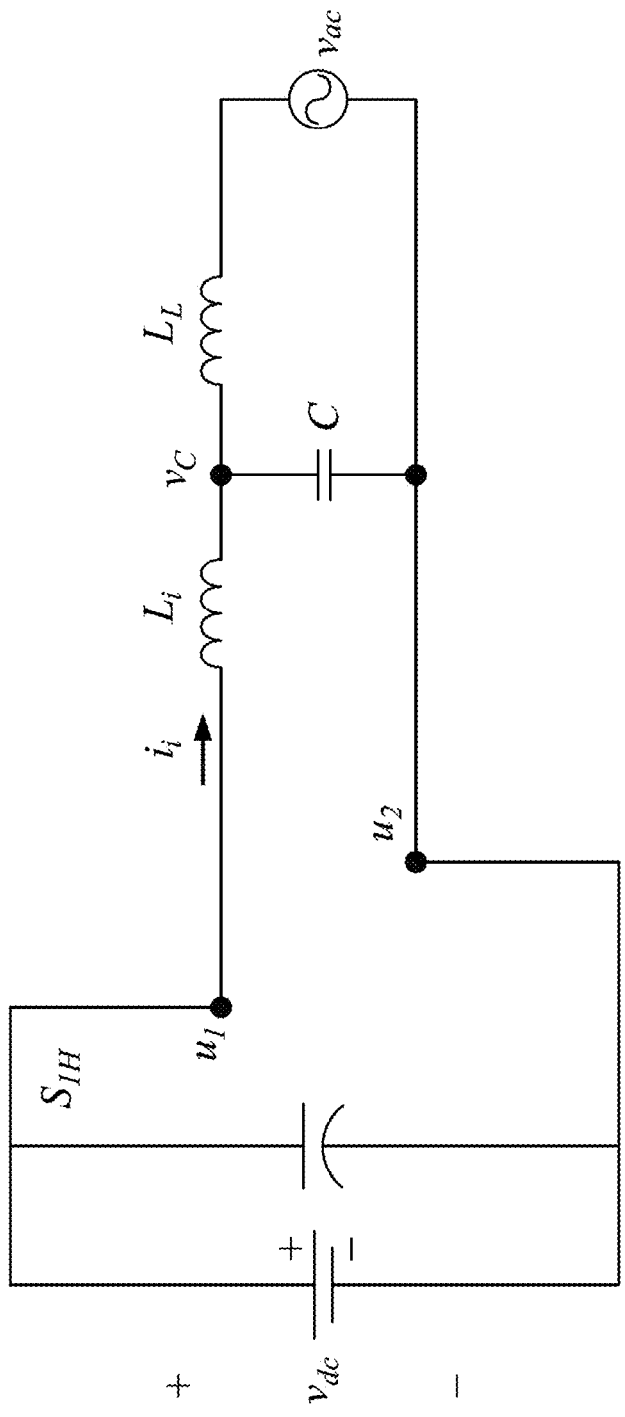
FIG. 4 is a schematic circuit diagram according to the single-phase bidirectional inverter with a current command for a positive half cycle of FIG. 2.
Figure 5:
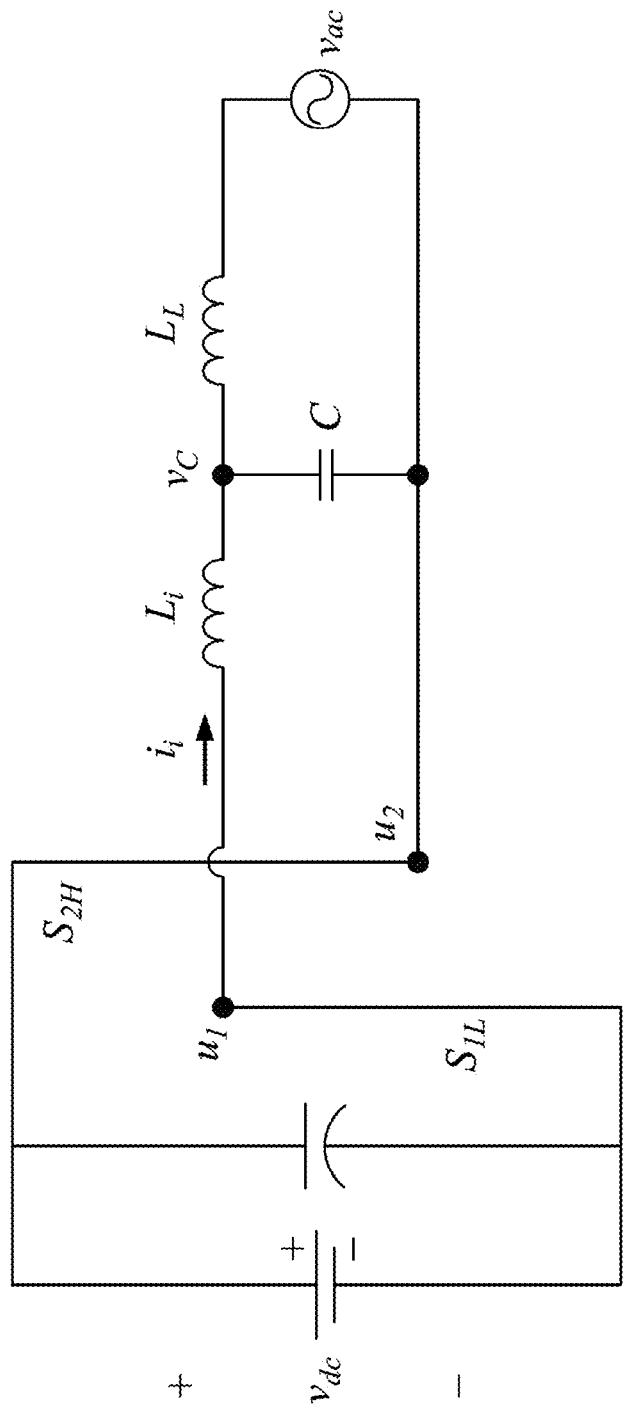
FIG. 5 is a schematic circuit diagram according to the single-phase bidirectional inverter with the current command for a negative half cycle of FIG. 2.

In detail, according to FIGS. 2, 4 and 5, wherein FIG. 4 is a schematic circuit diagram according to the single-phase bidirectional inverter 110a with a current command for a positive half cycle of FIG. 2, and FIG. 5 is a schematic circuit diagram according to the single-phase bidirectional inverter 110b with the current command for a negative half cycle of FIG. 2. In FIGS. 4 and 5, according to the extracting step S101, when the current command is in a positive fundamental cycle, the first switch $S_{1H}$ and the second switch $S_{2L}$ are turned on, the other first switch $S_{1L}$ and the other second switch $S_{2H}$ are turned off, and the inductor $L_i$ is in a excitation state to extract the magnetizing inductance $L_{im}$. When the current command is in a negative fundamental cycle, the first switch $S_{1H}$ and the second switch $S_{2L}$ are turned off, the other first switch $S_{1L}$ and the other second switch $S_{2H}$ are turned on, and the inductor $L_i$ is in a demagnetization state to extract the demagnetizing inductance $L_{id}$. Since the inductor $L_i$ of the filter module 112 varies greatly within one switching cycle, the new control law of the controlling method 100 for the single-phase bidirectional inverter 110 of the present disclosure will be described below.

In the calculating step S102, the duty ratio of the switch of the inverter module 111 is used to calculate the variation of the current of the magnetizing inductance $L_{im}$, and the variation of the current of the demagnetizing inductance Lia. Successively, in the integrating step S103, the variation of the current of the magnetizing inductance $L_{im}$ and the variation of the current of the demagnetizing inductance $L_{id}$ are integrated to obtain another duty ratio of the switch of the inverter module 111 in the next cycle. In detail, when the inductor $L_i$ is in the period of excitation and demagnetization, the current $i_i$ remains linear for different current offsets, and the new control law is derived according to the measurement results of the above inductor $L_i$.

When the inductor $L_i$ is in the excitation state, a variation $\Delta i_{mag}$ of the current of the magnetizing inductance $L_{im}$ can be obtained through the duty ratio as the following equation (4):

$$\Delta i_{mag} = \frac{v_{dc} - v_C}{L_{im}} DT_s. \quad (4)$$

When the inductor $L_i$ is in the demagnetization state, a variation $\Delta i_{demag}$ of the current of the demagnetizing inductance Lia can be obtained through the duty ratio as the following equation (5):

$$\Delta i_{demag} = \frac{-v_{dc} - v_C}{L_{id}} (1-D) T_s. \quad (5)$$

D is the duty ratio when the switch is on. $L_{im}$ is a value of the magnetizing inductance of the inductor $L_i$ in the single-phase bidirectional inverter 110a. $L_{id}$ is a value of the demagnetizing inductance of the inductor $L_i$ in the single-phase bidirectional inverter 110b. Ts is a switching period. $v_{dc}$ is the DC voltage. $V_C$ is a node voltage between the inductor $L_i$ and the capacitor C.

Assuming that $L_{id} = K L_{im}$, the equation (4) is added to the equation (5) to get a variation $\Delta i$ of the current in a switching cycle as the following equation (6):

$$\Delta i = \frac{v_{dc} - v_C}{L_{im}} DT_s + \frac{-v_{dc} - v_C}{L_{id}} (1-D) T_s. \quad (6)$$

Furthermore, a switching frequency $$\left( f_s = \frac{1}{T_s} \right)$$

is defined instead of the switching period and substituted into the equation (6), and the new control law of the another duty ratio D of the switch in the next cycle is integrated as the following equation (7):

$$D = \frac{L_{id} f_s}{(1+K)v_{dc} + (1-K)v_C} \Delta i + \frac{v_{dc} + v_C}{(1+K)v_{dc} + (1-K)v_C}. \quad (7)$$

Moreover, if K=1, it means $L_{im} = L_{id} = L_i$, and the existing control law can be obtained as the following equation (8):

$$D = \frac{L_i f_s}{2v_{dc}} \Delta i + \frac{v_c + v_{dc}}{2v_{dc}}. \quad (8)$$

Both the new control law and the existing control law obtained through the present disclosure can be represented by a combination of two components. However, in the new control law, due to the difference between the inductor $L_i$ during the excitation state and the demagnetization state, the new control law introduces a correction to the voltage applied by the inductor $L_i$. In order to realize a new current control law, the above-mentioned approximation method must be used to obtain the magnetizing inductance $L_{im}$ and the demagnetizing inductance $L_{id}$. Significantly, the controlling method 100 for the single-phase bidirectional inverter 110 of the present disclosure can be used to simulate a non-linear inductor with a variable inductance, and is not limited thereto. The performance difference between the new control law and the existing control law of the controlling method 100 for the single-phase bidirectional inverter 110 of the present disclosure is described below.

Figure 6:
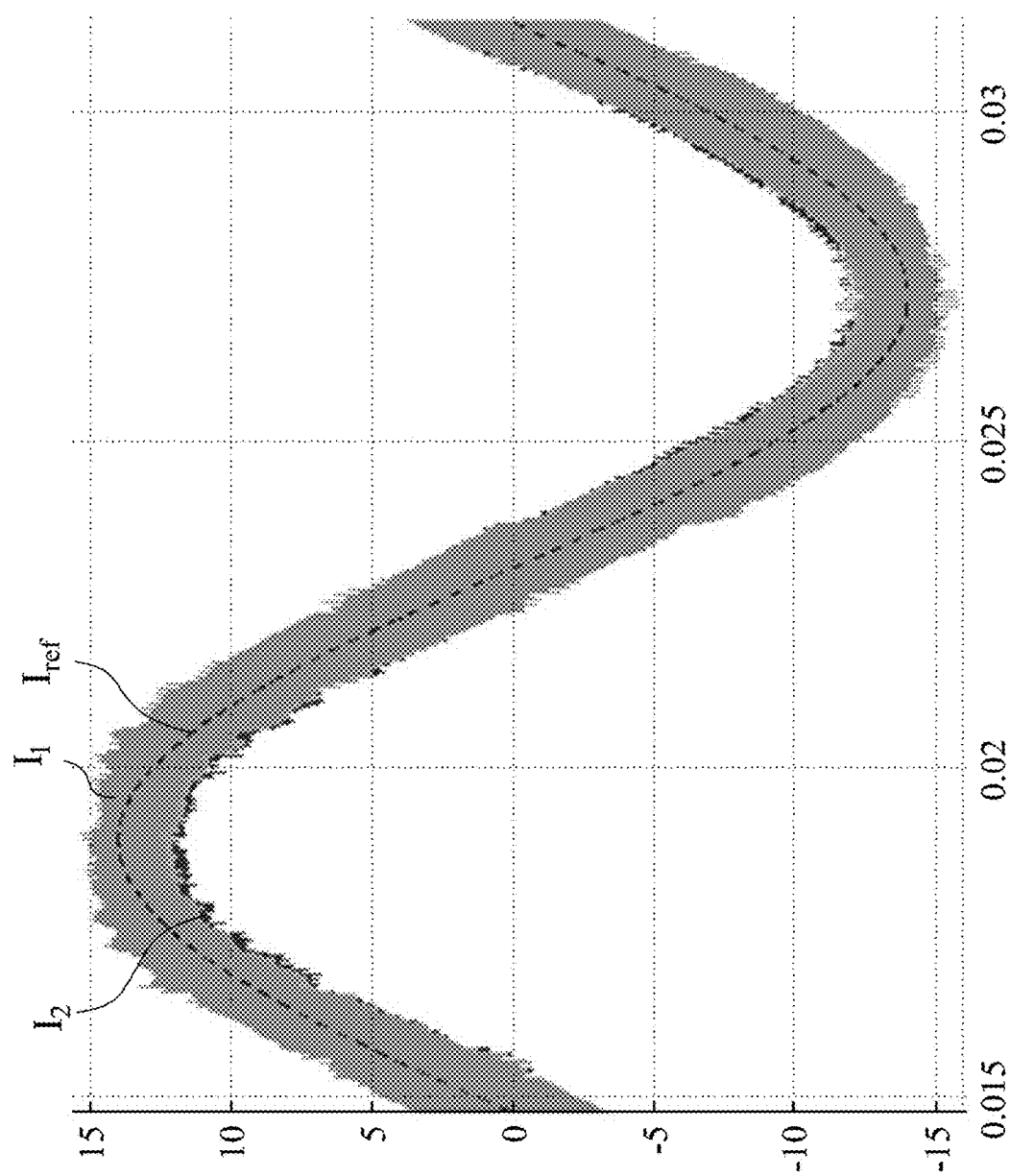
FIG. 6 is a comparing schematic view of a sinusoidal current command between an existing control law and a new control law.
Figure 7A:
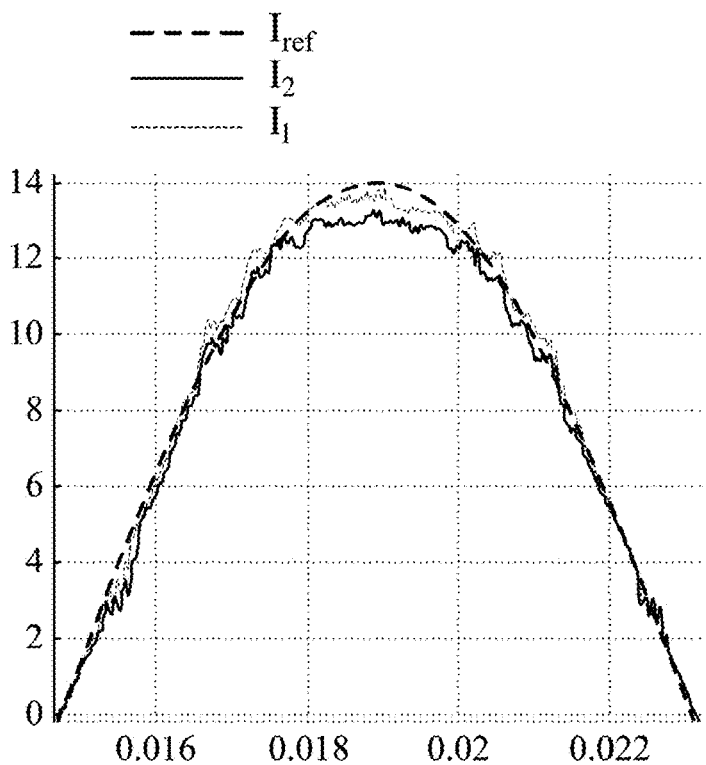
FIG. 7A is a comparing schematic view of middle points extracted from each of magnetizing regions according to the sinusoidal current command between the existing control law and the new control law of FIG. 6.
Figure 7B:
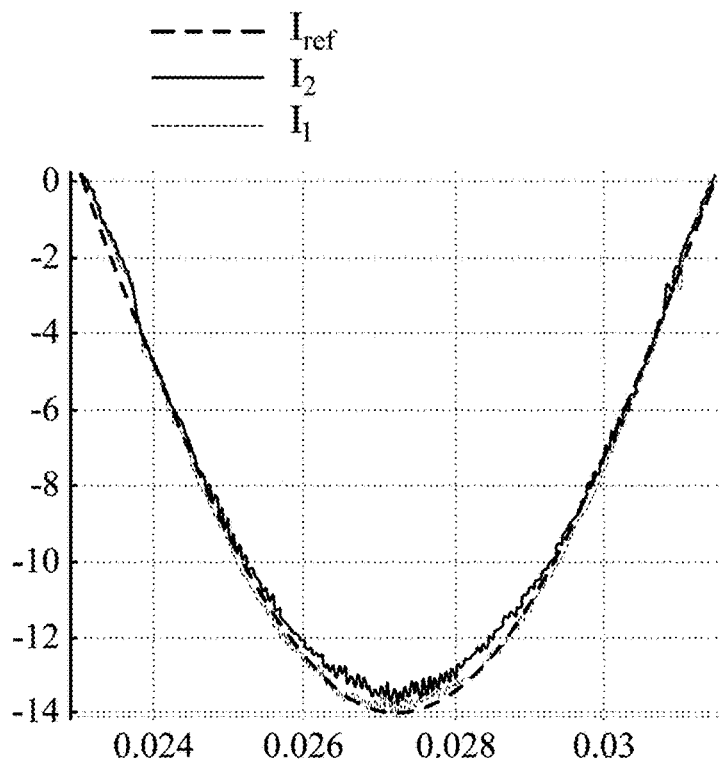
FIG. 7B is a comparing schematic view of middle points extracted from each of demagnetizing regions according to the sinusoidal current command between the existing control law and the new control law of FIG. 6.

FIG. 6 is a comparing schematic view of a sinusoidal current command $I_{ref}$ between an existing control law and a new control law. FIG. 7A is a comparing schematic view of middle points extracted from each of magnetizing regions according to the sinusoidal current command $I_{ref}$ between the existing control law and the new control law of FIG. 6. FIG. 7B is a comparing schematic view of middle points extracted from each of demagnetizing regions according to the sinusoidal current command $I_{ref}$ between the existing control law and the new control law of FIG. 6. FIG. 6 shows the test results using the abovementioned CM740125. The parameters of the nominal permeability $\mu_N$ and the fitting permeability $\mu_{fit}$ are shown in Table 2:

TABLE 2

|  | a | b | c |
|---|---|---|---|
| $\mu_N$ | 0.0100 | 4.070e−7 | 2.523 |
| $\mu_{fit}$ | 0.0101 | 8.586e−7 | 2.523 |

Furthermore, the other parameters set in the test are shown in Table 1. A turn of winding of the inductor $L_i$ is 24, and amplitude of the sinusoidal current command $I_{ref}$ is 14 A.

In FIG. 6, $I_{ref}$ is the sinusoidal current command. $I_1$ is the current of the inductor $L_i$ of the new control law. $I_2$ is the current of the inductor $L_i$ of the existing control law. Improvements in the current tracking of the new control law can be observed. In order to provide a clearer image, the middle points of each of the magnetizing regions and the demagnetizing regions of the original current waveform is extracted and plotted with the sinusoidal current command $I_{ref}$ in FIGS. 7A and 7B, respectively.

In FIGS. 7A and 7B, the current $I_1$ formed by the new control law produces a curvature closer to the sinusoidal current command $I_{ref}$. In order to evaluate and compare the improvement rates of tests and simulations, a Fast Fourier Transform (FFT) is for calculating the amplitude of the fundamental component of the sinusoidal current command $I_{ref}$. The results of the FFT and the calculated current tracking errors are shown in Table 3:

TABLE 3

|  | $I_{ref}$ | Current tracking | Errors |
|---|---|---|---|
| Existing control law | 14 A | 13.54 A | 3.29% |
| New control law | 14 A | 14.06 A | −0.42% |

In the given sinusoidal current command $I_{ref}$, the performance of the current tracking is improved about 2.87%. In the test, due to the uncertain influence of the parasitic parameters, the harmonic component of the signal is higher than the analog signal, but the improvement of errors of the current tracking remains the same. Because errors of the current tracking are in the same range as the simulation result. In other words, adapting to the variations in the inductor $L_i$ in the new control law can improve the current tracking.

In summary, the present disclosure has the following advantages: First, it is favorable for improving the capability of the current tracking of the inverter. Second, the difference between the magnetizing inductance and the demagnetizing inductance is estimated to improve the accuracy of the duty ratio.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A controlling method for a single-phase bidirectional inverter, the single-phase bidirectional inverter comprising a switch and an inductor, the controlling method for the single-phase bidirectional inverter comprising:
   an extracting step inputting a current command to the switch and obtaining a current through the inductor, wherein the current is piecewisely linearized to extract a magnetizing inductance and a demagnetizing inductance of the inductor;
   a calculating step using a duty ratio of the switch to calculate a variation of the current of the magnetizing inductance and a variation of the current of the demagnetizing inductance; and
   an integrating step integrating the variation of the current of the magnetizing inductance and the variation of the current of the demagnetizing inductance to obtain another duty ratio of the switch in next cycle.

2. The controlling method for the single-phase bidirectional inverter of claim 1, wherein the single-phase bidirectional inverter comprises an inverter module and a filter module, the inverter module is coupled with the filter module, and the inverter module comprises two first switches and two second switches.

3. The controlling method for the single-phase bidirectional inverter of claim 2, wherein in the extracting step,
   when the current command is in a positive fundamental cycle, one of the first switches and one of the second switches are turned on, the other one of the first switches and the other one of the second switches are turned off, and the inductor is in a excitation state to extract the magnetizing inductance; and
   when the current command is in a negative fundamental cycle, the one of the first switches and the one of the second switches are turned off, the other one of the first switches and the other one of the second switches are turned on, and the inductor is in a demagnetization state to extract the demagnetizing inductance.

4. The controlling method for the single-phase bidirectional inverter of claim 1, wherein the extracting step comprises a permeability equation, and the permeability equation is represented as the following equation:

$$\mu_{mag} = \frac{0.01}{a+bH^c};$$

wherein $\mu_{mag}$ is a magnetic permeability of the inductor after magnetization, H is a magnetic intensity of the inductor, and each of a, b, and c is a constant value.

5. The controlling method for the single-phase bidirectional inverter of claim 1, wherein the duty ratio of the switch obtained in the next cycle is represented as the following equation:

$$D = \frac{L_{id}f_s}{(1+K)v_{dc}+(1-K)v_C}\Delta i + \frac{v_{dc}+v_C}{(1+K)v_{dc}+(1-K)v_C};$$

wherein D is the duty ratio of the switch obtained in the next cycle during the switch turned on, $L_{id}$ is a value of demagnetizing inductance of the inductor in the single-phase bidirectional inverter, $f_s$ is a reciprocal of a period, $v_{dc}$ is a DC voltage, K is a constant value, and $v_c$ is a terminal voltage between the inductor and the filter module.

6. The controlling method for the single-phase bidirectional inverter of claim 1, wherein the duty ratio of the switch obtained in the next cycle is represented as the following equation:

$$D = \frac{L_i f_s}{2v_{dc}}\Delta i + \frac{v_c + v_{dc}}{2v_{dc}};$$

wherein D is the duty ratio of the switch obtained in the next cycle during the switch turned on, $L_1$ is a inductance of the inductor in the single-phase bidirectional inverter, $f_s$ is a reciprocal of a period, $v_{dc}$ is a DC voltage, and $v_c$ is a terminal voltage between the inductor and the filter module.

7. The single-phase bidirectional inverter, which is applied in the controlling method for the single-phase bidirectional inverter of claim 1, comprising:

an inverter module comprising two first switches and two second switches, wherein the first switches are connected in series to form a bridge arm, the second switches are connected in series to form another bridge arm, and input ends of the bridge arms are coupled for forming a DC end, the DC end is connected to a DC load; and a filter module coupled with the inverter module, wherein the filter module comprises the inductor and a capacitor, the inductor is connected to the capacitor in series, the inductor and the capacitor are connected to an AC end, an end of the inductor is coupled with an output end of the bridge arm of the inverter module, and an end of the capacitor is coupled with an output end of the other one of bridge arm of the inverter module.

\* \* \* \* \*